(12) United States Patent
Almodovar Chico et al.

(10) Patent No.: US 10,972,373 B2
(45) Date of Patent: Apr. 6, 2021

(54) VERTICAL HANDOVER

(71) Applicants: Koninklijke KPN N.V., Rotterdam (NL); NEDERLANDSE ORGANISATIE VOOR TOEGEPAST-NATUURWETENSCHAPPELIJK ONDERZOEK TNO, 's-Gravenhage (NL)

(72) Inventors: Jose Almodovar Chico, Delft (NL); Miodrag Djurica, Rotterdam (NL); Frank Den Hartog, Melba (AU)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 's-Gravenhage (NL)

( * ) Notice: Subject to any disclaimer, the term of this patent is extended or adjusted under 35 U.S.C. 154(b) by 0 days.

(21) Appl. No.: 15/305,330

(22) PCT Filed: Apr. 20, 2015

(86) PCT No.: PCT/EP2015/058506
§ 371 (c)(1),
(2) Date: Oct. 19, 2016

(87) PCT Pub. No.: WO2015/162088
PCT Pub. Date: Oct. 29, 2015

(65) Prior Publication Data
US 2017/0048127 A1      Feb. 16, 2017

(30) Foreign Application Priority Data
Apr. 23, 2014    (EP) .................................... 14165654

(51) Int. Cl.
 *H04L 12/26* (2006.01)
 *H04W 36/14* (2009.01)
 (Continued)

(52) U.S. Cl.
 CPC ............. *H04L 43/50* (2013.01); *H04W 36/14* (2013.01); *H04W 36/30* (2013.01); *H04W 84/12* (2013.01)

(58) Field of Classification Search
 CPC ........ H04L 43/50; H04L 12/26; H04W 36/14; H04W 36/30; H04W 84/12
 See application file for complete search history.

(56) References Cited

U.S. PATENT DOCUMENTS

| 7,551,586 B1 | 6/2009 | Yew et al. |
| 2003/0142651 A1 | 7/2003 | Matta et al. |

(Continued)

FOREIGN PATENT DOCUMENTS

| FR | WO2012010764 A1 * | 1/2012 | ............. H04L 12/28 |
| WO | WO 2004/021717 | 3/2004 | |

OTHER PUBLICATIONS

Notification of Transmittal of the International Search Report and the Written Opinion of the International Searching Authority, or the Declaration for PCT Application No. PCT/EP2015/058506, entitled: "Improved Vertical Handover," dated: Jun. 25, 2015.

(Continued)

*Primary Examiner* — Abdelillah Elmejjarmi
(74) *Attorney, Agent, or Firm* — Hamilton, Brook, Smith & Reynolds, P.C.

(57) ABSTRACT

System and method for making a vertical handover decision between first and second networks using a terminal configured to attach to both networks and a fixed point in either network. Both networks allow information flow between the terminal and the fixed point. When attached to the first (Continued)

network the terminal detects the second and compares a first bandwidth measurement, representing available bandwidth along a first path between the terminal and the fixed point, to a second bandwidth measurement representing available bandwidth along a second path between the terminal and the fixed point. The terminal maintains attach to the first network if the first bandwidth measurement is higher than the second bandwidth measurement and makes a decision to handover to the second network if the second band- width measurement is higher than first bandwidth measurement.

15 Claims, 11 Drawing Sheets

(51) Int. Cl.
*H04W 36/30* (2009.01)
*H04W 84/12* (2009.01)

(56) References Cited

U.S. PATENT DOCUMENTS

| | | | | |
|---|---|---|---|---|
| 2004/0170191 A1* | 9/2004 | Guo | ................. | H04W 36/0088 370/468 |
| 2007/0008929 A1* | 1/2007 | Lee | ...................... | H04W 36/26 370/331 |
| 2008/0046610 A1* | 2/2008 | Tripathi | .............. | G06F 9/45558 710/36 |
| 2008/0101318 A1* | 5/2008 | Taaghol | ................ | H04W 36/04 370/342 |
| 2008/0298321 A1* | 12/2008 | Lee | ...................... | H04L 12/5692 370/331 |
| 2009/0029703 A1* | 1/2009 | Turnbull | ........... | H04W 36/0011 455/436 |
| 2010/0246534 A1* | 9/2010 | Vargantwar | ......... | H04W 36/385 370/332 |
| 2012/0184277 A1 | 7/2012 | Hiltunen et al. | | |
| 2013/0065633 A1* | 3/2013 | Sridhara | ................ | H04W 48/20 455/525 |
| 2014/0022918 A1 | 1/2014 | Guo et al. | | |
| 2014/0355565 A1* | 12/2014 | Hayes | ................ | H04W 36/245 370/331 |

OTHER PUBLICATIONS

European Search Report for EP Application No. 14165654.6, dated: Oct. 16, 2014.
Kim, D. P. and Koh, S. J., "Adaptive Congestion Control of mSCTP for Vertical Handover Based on Bandwidth Estimation in Heterogeneous Wireless Networks," *Wireless Pers. Commun.*, (2009).
Busanelli, S., et al., "Vertical Handover between WiFi and UMTS Networks: Experimental Performance Analysis," *International Journal of Energy*, 2(1): 75-95 (2011).

* cited by examiner

VERTICAL HANDOVER

This application is the U.S. National Stage of International Application No. PCT/EP2015/058506, filed Apr. 20, 2015, which designates the U.S., published in English, and claims priority under 35 U.S.C. §§ 119 or 365(c) to European Application No. 14165654.6, filed Apr. 23, 2014. The entire teachings of the above applications are incorporated herein by reference.

The invention concerns a system for making a vertical handover decision between a first network and a second network in a mobile terminal configured to attach to both the first and second networks, a method of making a vertical handover decision, and system for making a vertical handover decision between first and second networks, where the second network is a Wi-Fi network to which a mobile terminal can attach through an Access Point.

BACKGROUND

Developments in mobile terminals, in particular mobile phones and other terminals connecting to 3G, 4G, 5G etc., and in connectivity and data packet networks, and in particular VoIP (Voice over IP) methods, mean that there is an interest in mobile terminals connecting wirelessly to IP networks as well as connecting to telecommunications networks in the more traditional manner through base stations. With the advent of wireless internet access in the home users can now attach their mobile terminal, for example a smart phone, to the internet directly through their own wireless internet Access Point or access router when in their own domestic environment as well as connect in the usual manner through the telecommunications network. This offers particular advantages to the user and in particular may offer the advantage of reduced cost.

The same can occur outside the user's own domestic environment when the terminal, while connected to the mobile phone network via a base station comes into the field of a Wi-Fi hotspot, for example. The user of the mobile may then choose to attach the mobile to the Wi-Fi Access Point and use mobile services directly through the internet. Similarly the user can attach their mobile phone to another user's Wi-Fi access, for example upon invitation when visiting friends.

Cellular network users typically demand connectivity everywhere and at any time but they also seek for the best quality of service possible and these three demands can be summarized in the concept known as 'Always Best Connected' according to which the user should be able to take advantage of the best available access network at any point of time. As yet handover mechanisms do not operate entirely according to the Always Best Connected principle.

Handover mechanisms are those protocols and programs by which communication control of a mobile terminal transfers from one network access portal to another, for example when mobile terminal attach to a telecommunications network is switched from one base station to another, either in the same network or in different networks. This transfer of mobile terminal access is known as horizontal handover and can also be described as a handover between homogeneous networks, or networks using the same technology. Transfer of attach from one type of network to another entirely different type with different capabilities and characteristics, for example from a mobile telecommunications network to a Wi-Fi network, is known as vertical handover, and can be described as a handover between heterogeneous networks.

Currently handover mechanisms for vertical handover between heterogeneous networks are user set and based on an assumption that Wi-Fi is for free while 3G/4G/5G is not. However this is based on an old business model which is no longer universally in use. Assuming the user has set the appropriate user preferences mobile terminals perform a handover to Wi-Fi whenever an access point that is registered in the terminal becomes available, and otherwise not. However, this does not take into account the Quality of Service, or QoS, which will be experienced after handover or whether the handover will benefit the needs of the user.

Vertical Handover between Wi-Fi and UMTS Networks: Experimental Performance Analysis by S. Busanelli, et al. describes a method of vertical handover using bandwidth estimation techniques in which a mobile terminal attached to a first network detects a second network and attaches to it while maintaining attach to the first network and then performs an available bandwidth estimation while maintaining both attaches.

An improved method of performing vertical handover is required.

SUMMARY

The invention is described in the claims and concerns a system for making a vertical handover decision between a first network and a second network, comprising a first network, a second network, a terminal configured to attach to both the first and second networks, and a fixed point in either the first or second network. Both the first and second networks allow information flow between the terminal and the fixed point and the terminal is configured to detect the second network when it is attached to the first network. The terminal is also configured to compare a first bandwidth measurement to a second bandwidth measurement. The first bandwidth measurement represents available bandwidth along a first path length between the terminal and the fixed point, which first path length includes access to the fixed point through the first network. The second bandwidth measurement represents available bandwidth along a second path length between the terminal and the fixed point, which second path length includes access to the fixed point through the second network. Having performed the comparison, if the first bandwidth measurement is higher than the second bandwidth measurement then the terminal maintains attach to the first network. However, if the second bandwidth measurement is higher than first bandwidth measurement then the terminal makes a decision to handover to the second network.

Thus the terminal is now able to make an improved vertical handover decision based on available quality of service. In other words the terminal is able to control whether or not to perform vertical handover based on how good a service is available.

Typically the terminal will be a mobile terminal such as a mobile telephone or other such device capable of connecting to networks of two different technologies, such as connecting to either a 3G, 4G or 5G telecommunications network and additionally a Wi-Fi network. The terminal can therefore also be a tablet, smartphone or other handheld communication device. However the terminal can also be a laptop or even a desktop computer, for example one connected to Ethernet and Wi-Fi.

Typically the first and second networks will be heterogeneous networks, in other words networks which offer different characteristics. Such networks are typically operated by different entities and therefore information about the operating characteristics and Quality of Service of both networks does not reside with one entity. The terminal or other mobile device will typically be attached to the first network and will detect the availability of the second network. Methods and protocols for detection of the second network are known to the skilled person.

Upon detection of the second network the terminal or mobile terminal compares a first bandwidth measurement to a second bandwidth measurement. The first bandwidth measurement represents available bandwidth in the first network and the second bandwidth measurement represents available bandwidth in the second network. By comparing the first bandwidth measurement to the second bandwidth measurement the mobile terminal is able to assess which of the two networks offers better or superior Quality of Service.

Methods of comparing the first bandwidth measurement to the second bandwidth measurement, in other words of comparing one value to another value, are known to the skilled person.

The terminal then maintains attach to the first network if the first bandwidth measurement is higher than the second bandwidth measurement, or alternatively, makes a decision to handover to the second network if the second bandwidth measurement is higher than first bandwidth measurement. If the terminal maintains attach to the first network it need never attach to the second network and this saves resources because both the mobile terminal and the second network avoid the processing and signal generation associated with network attach. If the terminal makes the decision to handover then it can detach from the first network as soon as it is able to ensure seamless transfer of attach to the second network. In other words it no longer needs to automatically instigate, or begin, an attachment to the second network but instead maintains an attachment to the first network while it assesses the second network, basing the handover decision on the results of the assessment. In the case when the second network does not offer improved performance over the first network the terminal stays attached to the first network, thus saving resources. The terminal or mobile terminal therefore takes a definitive decision based on two readings of network performance.

If the second measurement is better than the first measurement and the terminal makes the decision to perform handover to the second network then it is not required to perform handover immediately but can perform handover as soon as reasonably achievable, or when it benefits the terminal. For example, if a voice call is underway the mobile might perform handover when it judges it can transfer the call without loss of data, and this is particularly useful when the terminal is a mobile telephone or other mobile handset capable of making telephone calls through a 3G, 4G or 5G network The first and second measurements used by the terminal for comparison represent available bandwidth along a first and second path lengths, respectively, between the terminal and a fixed point, where the fixed point is somewhere accessible through either the first or second network and is a point to which measurements can be made from the terminal. Typically the fixed point is in either the first or second network or somewhere in the internet. The first path length includes access to the fixed point through the first network. The second path length includes access to the fixed point through the second network.

Typically the first or second path length comprises the entire path length between the terminal and the fixed point and this has the particular advantage that the terminal can base its decision on an entire path length deep into the core information network. Additionally, by using data which relates to a real path length from the terminal to a fixed point the terminal is able to compare measurements that take into account the interface and contemporary conditions between the terminal and the two networks between which it is deciding. In other words the system as described takes into account the actual conditions under which the terminal or mobile terminal is operating and does not assume a blanket decision to always favour one type of network over another.

Typically the fixed point is a server or a dedicated computer somewhere in the first or second network or in the internet. Typically, since the handover is a vertical handover then either the first or second network is a 3G or 4G or a 5G telecommunications network and the other network will typically be a Wi-Fi network. However other heterogeneous combinations are possible.

In one embodiment, and when one network is a Wi-Fi network, it is operated from an Access Point and the fixed point can be in the Access Point.

In a further advantageous embodiment, and when the Wi-Fi network is a domestic Wi-Fi network, the fixed point is on a home gateway in the domestic network configured to connect the domestic Wi-Fi network to a wider network. In this case the wider network will typically be the Internet and the home gateway will be a gateway device configured to act as a bridge between the domestic network and the Internet.

In a particularly advantageous embodiment the terminal is configured to derive either the first or second bandwidth measurement by performing an available bandwidth measurement, for example a speed test, to the fixed point through either the first or second network respectively.

In a particularly advantageous embodiment the terminal is configured to receive either the first or second bandwidth measurement from an Access Point. Typically in this embodiment either the first or second network is a Wi-Fi network operated from an Access Point and the terminal or mobile terminal is configured to receive either the first or second bandwidth measurement respectively from the access point. This has the advantage that the mobile terminal does not have to perform bandwidth measurements itself but can receive the results of bandwidth measurements performed by other entities in either of the two networks. Further, the information can be incorporated into existing messaging protocols which are used between terminal and Access Point and this has the further advantage of transferring bandwidth information to the terminal without unnecessarily loading the Wi-Fi network with additional messaging. As an example the bandwidth measurement can be received from the Access Point comprised in, or derived from, a beacon frame, as transmitted regularly by Wi-Fi access points. Alternatively, the bandwidth measurement can be comprised in an Association Accept message or Association Reject message transmitted from the Access Point in response to an attach request transmitted by the terminal to the Access Point. Note that in this example the terminal does not have to actually attach to the Access Point unless the bandwidth provided by the Wi-Fi network offers advantages over the bandwidth already on offer via the network to which the terminal is already attached.

In a further advantageous embodiment a bandwidth measurement transmitted in either a Beacon Frame, Association Accept message or Association Reject message can be comprised in a vendor specific field in the respective message and this had the advantage that bandwidth information can be provided to the terminal without the necessity of a new messaging protocol. Alternatively, however, a new messaging protocol can be used.

In a further particularly advantageous embodiment the terminal or mobile terminal is configured to store the first or second bandwidth measurement before comparison. This allows the terminal to receive a bandwidth measurement before it is needed and store it for future use. For example, a mobile terminal successfully attached to a first network may receive a bandwidth measurement from the first network and store it in case a second network, of a different technological type, is detected. Upon detection of a second network the mobile terminal already has a first bandwidth measurement for the first network and need only somehow acquire a second bandwidth measurement for the second network. Stored bandwidth measurements can be updated, as appropriate, by networks. This has the advantage that the mobile terminal is kept updated with measurements representative of actual network bandwidth.

In another advantageous embodiment the first network is a 3G or 4G or 5G network, the second network is a Wi-Fi network operated from an Access Point, and the terminal is configured to contact the Access Point through the first network to request data for the second bandwidth measurement. This has the particular advantage that the terminal can gain the information needed to perform the comparison between two bandwidth measurements without having to perform attachment to the second network.

In particular the terminal can request data for the first or second bandwidth measurement from the fixed point itself, typically being the server or dedicated computer. In this case the terminal requests the fixed point to perform the available bandwidth measurement, or measurements, and subsequently communicate the results or the comparison of the results to the terminal.

The method of the invention, as operated by the system, is undertaken between a terminal and a first network and a second network. Both networks allow information flow between a terminal and a fixed point and the method is performed in a terminal attached to the first network. The terminal detects the second network and then compares a first bandwidth measurement with a second bandwidth measurement. The first bandwidth measurement represents available bandwidth along a first path length between the terminal and the fixed point. The first path length includes access through the first network to the fixed point. The second bandwidth measurement represents available bandwidth along a second path length between the terminal and the fixed point. The second path length includes access through the second network to the fixed point. Upon comparison of the first and second bandwidth measurements the terminal performs one of two actions depending on the result of the comparison. If the first bandwidth measurement is higher than the second bandwidth measurement the terminal maintains attach to the first network. Alternatively, if the second bandwidth measurement is higher than first bandwidth measurement the terminal makes a decision to perform a vertical handover to the second network.

Advantageously, the comparison between the first bandwidth measurement and the second bandwidth measurement occurs before the terminal is authenticated in the second network. This saves both terminal and network resources because neither the terminal nor the network are required to instigate an attach procedure for the terminal to the second network before finding out if the second network offers superior bandwidth to the first network.

If the second bandwidth measurement is higher than the first bandwidth measurement, then in a particularly advantageous embodiment if the terminal detects that an active session is underway through the first network, for example a voice session, a telephone call, the downloading of data, then the terminal can defer the vertical handover until after the active session has ended. This has the advantage of reducing the potential for data loss which may occur in handover during an active session.

In an alternative embodiment, if the first bandwidth measurement is higher than the second bandwidth measurement then the terminal maintains attach to the first network but can acquire a new second bandwidth measurement, or multiple subsequent second bandwidth measurements, and re-performs comparison. This allows the terminal to check and recheck the best network for bandwidth in the event that the terminal maintains its location in the vicinity of the second network.

The invention also concerns a system for making a vertical handover decision between a first network and a second network, wherein the second network is a Wi-Fi network to which a terminal can attach through an Access Point, and a terminal configured to attach to both the first and second networks, and a fixed point. Both the first and second networks allow information flow between the terminal and the fixed point, and the terminal is configured to, when attached to the first network detect the second network and transmit an association request to the Access Point. The Access Point is configured to compare a first bandwidth measurement to a second bandwidth measurement. The first bandwidth measurement represents available bandwidth along a first path length between the terminal and the fixed point which path length includes access through the first network. The second bandwidth measurement represents available bandwidth along a second path length between the terminal and the fixed point which path length includes access through the second network. In the system as described, if the first bandwidth measurement is higher than the second bandwidth measurement the Access Point transmits a reject message to the terminal. Alternatively, if the second bandwidth measurement is higher than first bandwidth measurement the Access Point transmits an accept message to the terminal.

The invention allows performance of a handover based on end-to-end available bandwidth from, for example, a mobile terminal to a fixed point, a server say, in a network, typically the Internet, and where the end-to-end available bandwidth can be measured via either connection. In this sense 'end-to-end' means the available bandwidth of the complete path between the mobile terminal and the fixed point, or server, and which is usually given by the weakest link in that path, in other words the link with the smallest available bandwidth. This is an important measure, since the path taken via the 3G/4G/5G network and the path taken via the Wi-Fi network may be very different from each other and one or other may face unexpected constraints on available bandwidth or other Quality of Service parameters.

Two problems occur when attempting to do this. The first is that while a terminal or mobile terminal may know the available bandwidth on the radio link it is directly attached to, it does not know the quality of the backbone connection to and in the Internet. This backbone connection can vary greatly. The invention proposes measuring this available bandwidth in real time and therefore makes it possible for the terminal to decide on performing a handover according to information which is current, or contemporary. The second problem is that in the event that a handover is performed it should not interfere with service. Therefore to avoid service interruption during handover the terminal makes the decision on handover, but does not necessarily perform handover at that point in time. The terminal decides on performing the handover but the method of the invention allows this without the terminal being required either to perform a trial handover first, or being required to perform a handover immediately a decision is taken to perform handover. The method allows the terminal to make a decision before it is authenticated in the network of interest and, for example when the second network is a Wi-Fi network, receives an IP address.

Handover of Internet traffic from 3G/4G/5G to Wi-Fi networks is an interesting tool for operators in order to minimize the usage at the base stations which may be overloaded. In particular an overloaded base station may not be able to accept any more users and in addition to horizontally handing over some terminals to other bases stations in the same network it is advantageous to have a mechanism whereby terminals can be provided with the information whereby they can take a decision as to which network is best for them. As available bandwidth decreases on a 3G/4G/5G network, for example, due to increased user loading, a second available network might become more attractive and using the method of the invention an individual mobile terminal can hand itself over to the second network and release capacity on the first network.

For end users it is also interesting to be able to automatically select an appropriate network based on quality of network available. The quality of a 3G/4G/5G network is often better than the quality of Wi-Fi, in the sense of having superior quality of the over-the-top connection to an Internet service. This provides improved mobile phone use for the user but also improves network connections for the stationary user. For example, a computer terminal connected to Ethernet and Wi-Fi, for example a personal computer (pc) can perform the method and, for example, perform handover to Wi-Fi when the Ethernet link is congested.

Previously, vertical handover procedures did not take into account how much capacity there was available on any detected Wi-Fi access point, or on the backbone network of that Wi-Fi access point, and this is not in line with the concept of Always Best Connected. It does not take into consideration the quality of service that a terminal will experience in transferring attach from one type of network to another. For example, a Wi-Fi access network may become available but the quality of service offered may be worse than on 3G/4G/5G network. The invention allows such criteria to play a role during the information gathering and decision phases of the handover procedure.

Therefore the invention offers significant advantages to the user and also to the network operator supplying telecommunications network service to the user. These and other embodiments are further described in the Figures.

DETAILED DESCRIPTION

Figure 1:
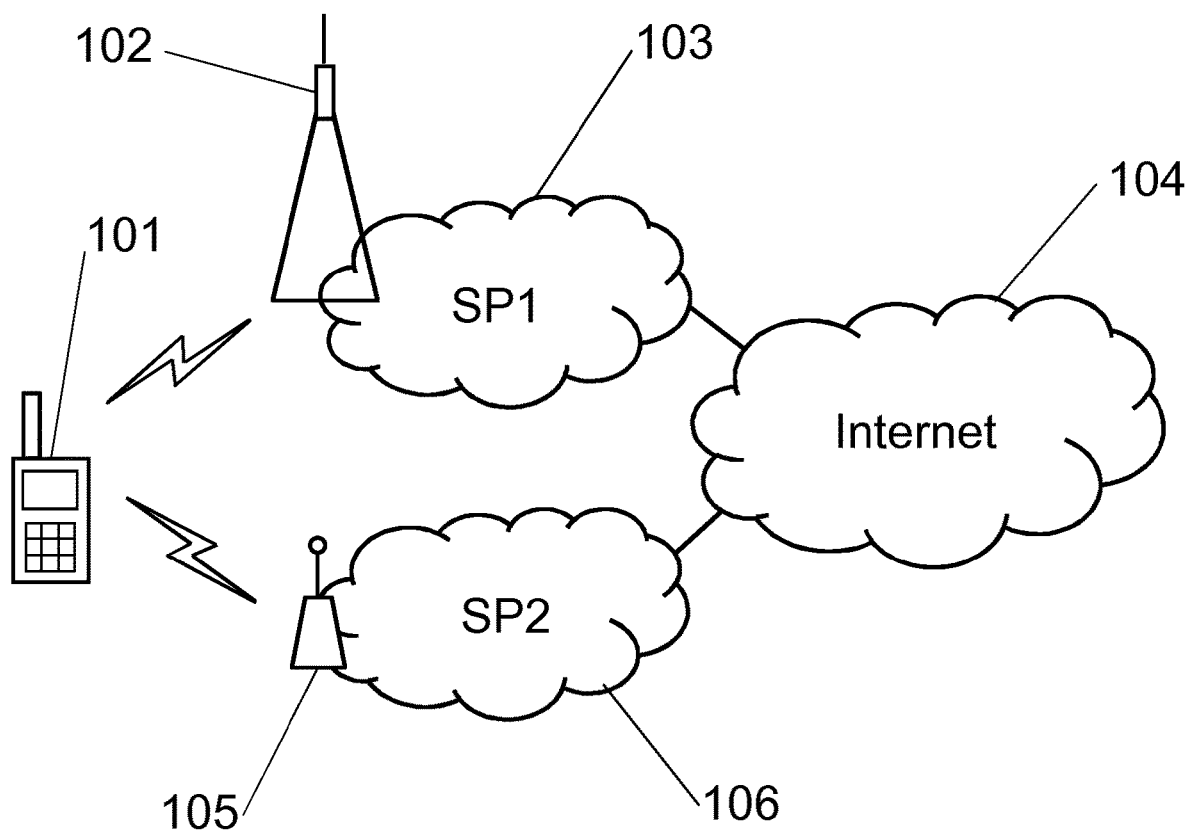
FIG. 1 shows an example of handover according to the prior art.

FIG. 1 shows an example of vertical handover. This Figure and others shows a mobile phone however the systems and methods as described are also applicable to tablets, laptops, computers plus other hand held devices capable of connecting to more than one type of network. A mobile terminal 101 is connected to a base station or eNodeB 102 which is part of the network of service provider SP1 103. Network SP1 103 can be a 3G, 4G or 5G network. Terminal 101 is able to make telephone calls via network 103 and also access the Internet 104. If terminal 101 enters an area covered by Access Point 105, controlling a Wi-Fi access to service provider SP2 106, which also allows connection to the Internet 104, then terminal 101 can perform a handover to the network SP2 106 via its Access Point 105. Both bases stations or eNodeBs 102 and Access Points 105 are functionally the same devices in the sense that they enable a mobile terminal 101 to connect to a network and run services on those connections. Typically during the handover process the mobile terminal maintains its connection active while moving from one point of attachment, the base station or access point to another.

Alternatively a handover can be performed in the other direction, from the network of SP2 106 to the network of SP1 103.

Figure 2:
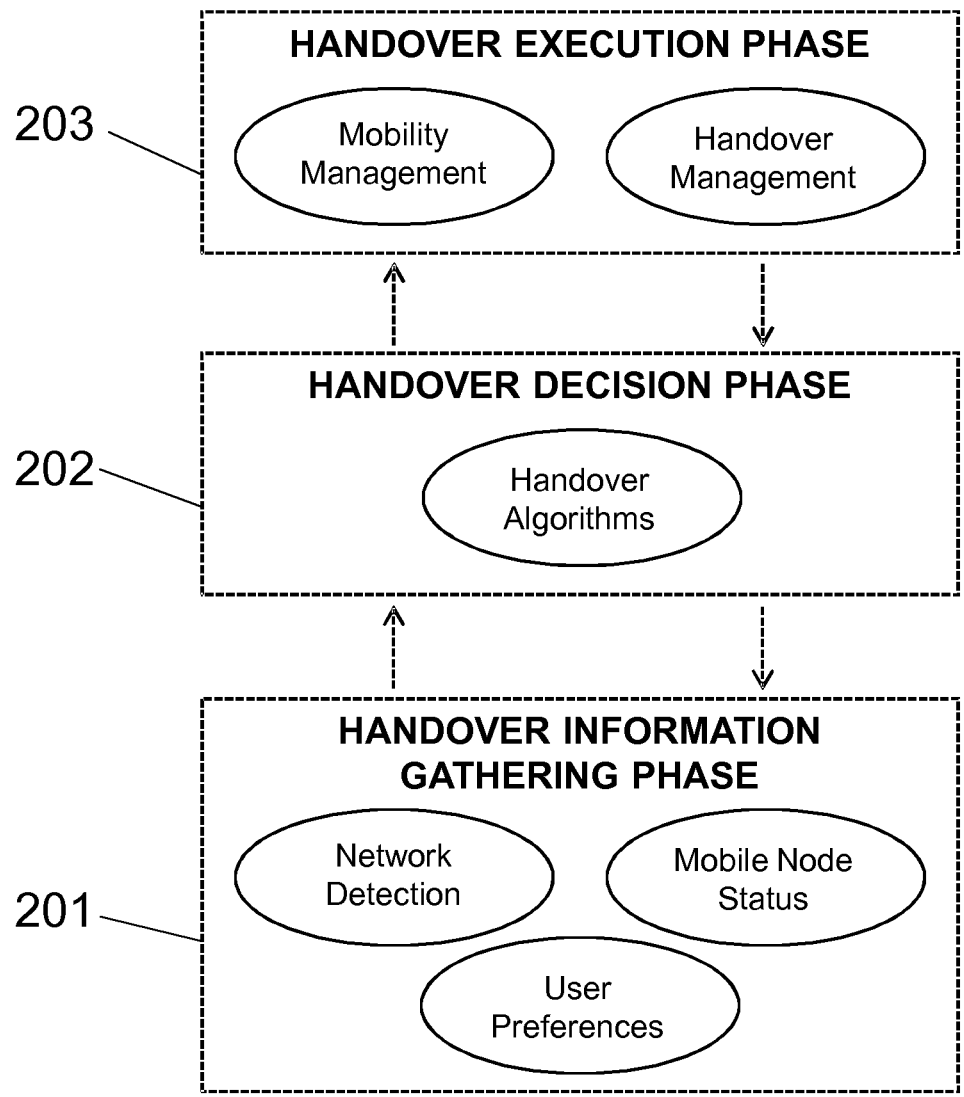
FIG. 2 shows a handover management procedure according to the prior art.

FIG. 2 shows a typical handover process. Three phases can typically be distinguished. In the first phase 201, a handover information gathering phase, information is collected in order to be used and processed for making decisions in the next phase. Typically during this phase a network is detected, and user preferences and mobile node status are identified in order to correctly decide whether handover should be attempted. For example, a user may have set a user preference that indicates the user prefers to attach to Wi-Fi whenever Wi-Fi is available. In the second phase 202, a handover decision phase, algorithms decide whether to perform the handover or not, and decide the moment to do so. Handover should ideally be executed at the optimal moment. In the third phase 203, a handover execution phase, handover is performed. This phase should guarantee a smooth session transition process between networks.

Figure 3:
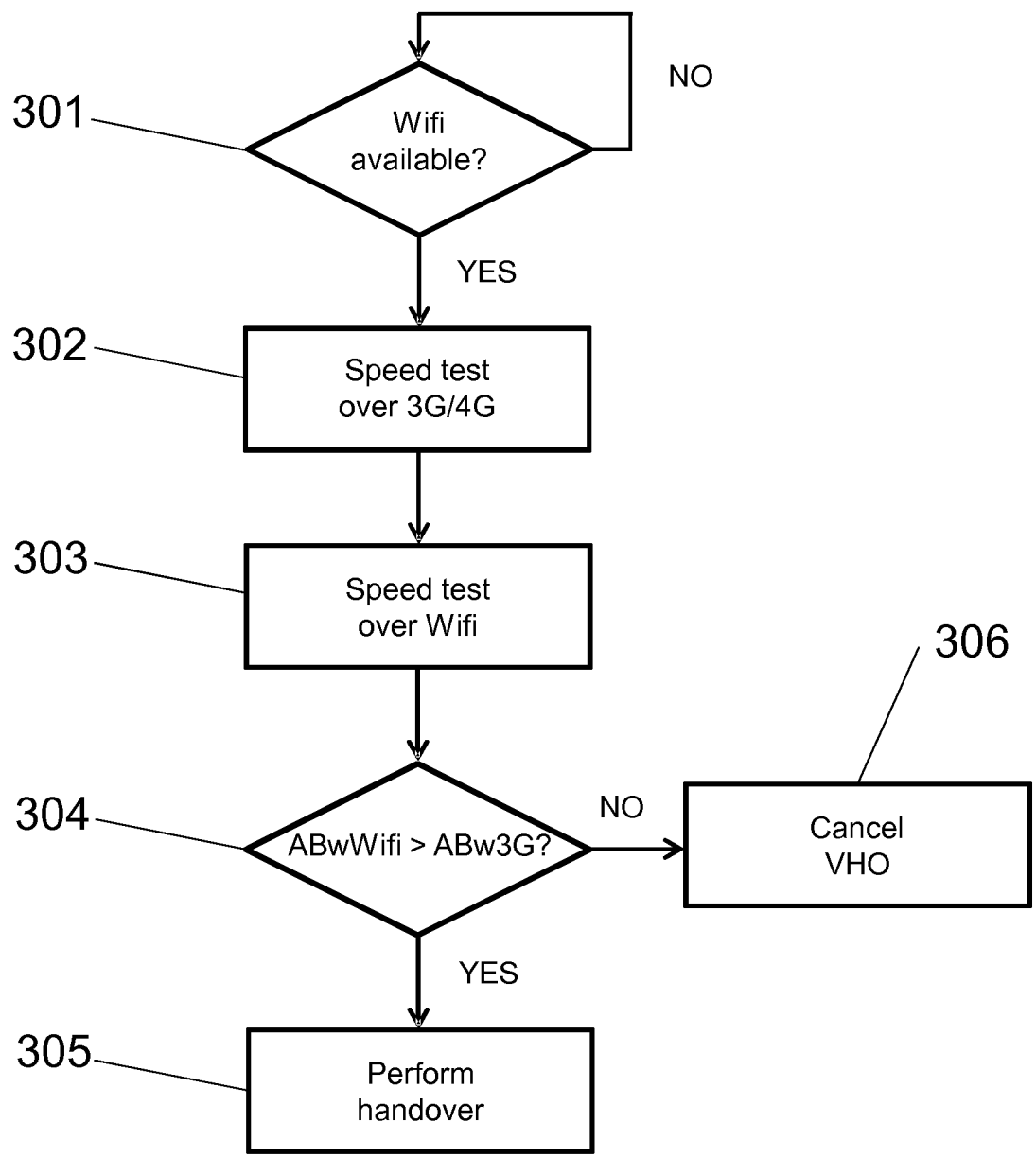
FIG. 3 shows the main steps of the invention as applied to a vertical handover.

FIG. 3 shows the main, and simplified, steps of the decision process as applied to a vertical handover in most embodiments of the invention. In this example it is assumed that a mobile terminal is connected to a 3G/4G/5G base station or eNodeB (BS) and a Wi-Fi access point (AP) becomes available 301. The mobile terminal will proceed in the following manner to decide on whether or not to perform a vertical handover into the Wi-Fi network. First, the terminal performs a speed test 302 over the 3G/4G/5G network to a server in the Internet. In some embodiments this step may have been performed already, before detection of a suitable Wi-Fi network and in that case the result of the speed test will have been stored. Many methods for performing speed tests are already available as state of the art and are known to the skilled person. The terminal will perform an equivalent speed test over the Wi-Fi network to the same server in the Internet 303. Finally, the terminal will compare the available bandwidth over the 3G/4G/5G network (ABw3G), resulting from the first speed test 302, and the available bandwidth over the Wi-Fi network (ABwWi-Fi), resulting from the second speed test 303. If ABwWi-Fi is higher than ABw3G 304, the mobile terminal will proceed to complete the vertical handover 305, otherwise the vertical handover will be cancelled 306. The available bandwidth of interest can be downstream (from the server to the mobile terminal) or upstream (from the mobile terminal to the server), depending on the specifics of the service the terminal wants to use on either network. In most cases, however, the available bandwidth of interest is downstream and this is applicable if the user is engaged in downloading data, for example films, documents etc.

Figure 4:
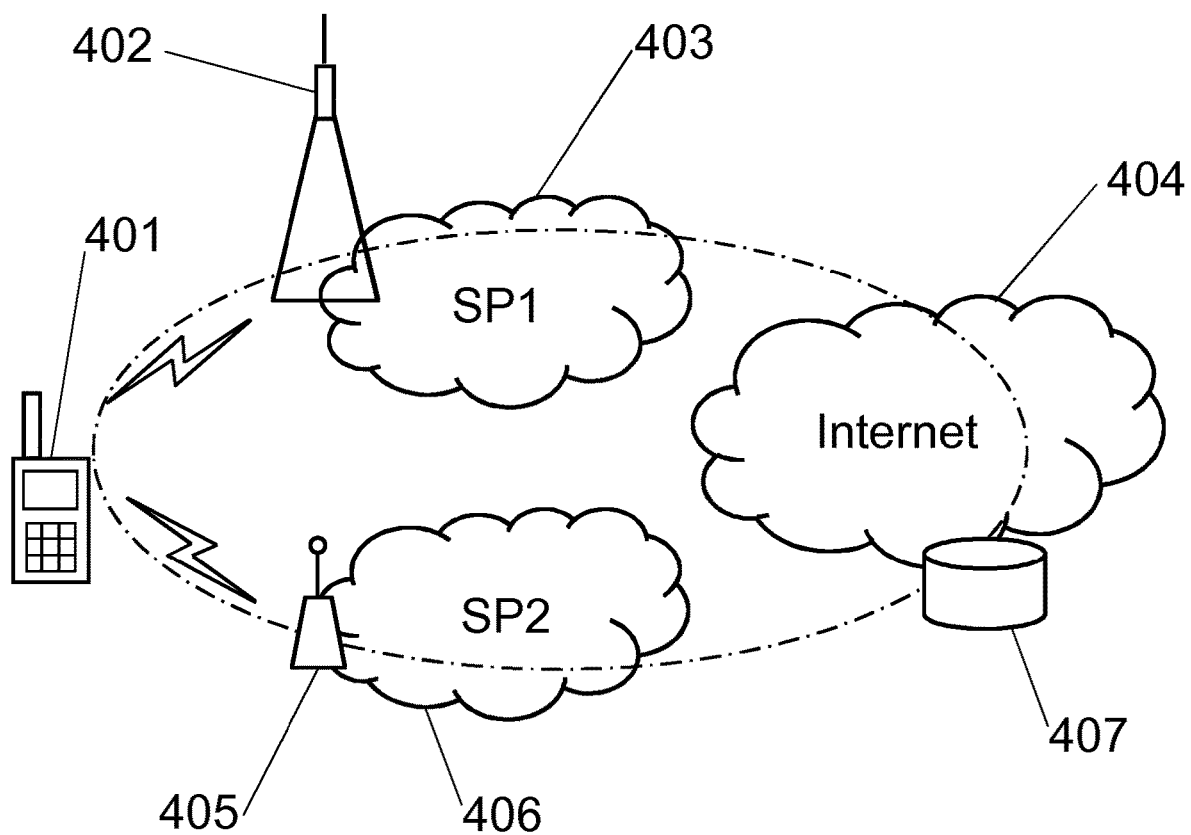
FIG. 4 shows the main components of the invention as applied to a vertical handover.

FIG. 4 shows the main components of the invention as applied to a vertical handover. A mobile terminal 401 is connected to a base station or eNodeB 402 which is part of the network of service provider SP1 403 which can be a 3G, 4G or 5G network. Terminal 401 is located in an area covered by Access Point 405, controlling a Wi-Fi access to service provider SP2 406, which also allows connection to the Internet 404. It does not matter if SP1 and SP2 are the same entity or not. A fixed point 407, in this case depicted as a test server, is located in the Internet 404 and can be used in measurements of available bandwidth. This server should be reachable from both SP1 403 and SP2 406. Fixed point, or test server 407 can also be referred to as a Speed Box.

There are several ways in which a Speed Box can be implemented.

The speed box can be a dedicated computer on the Internet 404. The handover application on the mobile terminal 401 knows the IP address of speed box 407 and performs available bandwidth tests to the computer. The skilled person knows methods by which the mobile terminal can perform available bandwidth testing.

Alternatively speed box 407 may be a piece of software added to the server of another Internet service, for instance a webpage that the terminal 401 has visited before performing the method for deciding on handover. In this embodiment when the terminal 401 detects second network 406 it performs a speed test via SP1 403 to the webpage it last visited and then also performs a speed test to the same webpage via SP2 406. Thus there may be more than one Speed Box 407 in the Internet.

Preferably there is a Speed Box physically near to every Internet service's server. In this way the mobile terminal 401 always gets a realistic value for the available bandwidth to the service in demand. In some cases no software needs to be added to the server and just knowledge of the server's IP address is enough.

Speed box 407 may be a computer or piece of software running in the network of SP1 403 or SP2 406, where SP1 or SP2 respectively offers the handover application as a service to its customers. In a special case of the latter example the software runs on the WAN-side of the Wi-Fi AP, and this can for example be a home gateway, and has advantages with regard to deployability. For any Basic Serving Set IDentifyer (BSSID), in other words the AP MAC address, that the terminal wishes to connect to, it can find an IP address of a local Speed Box, namely the AP belonging to that BSSID. Interpretation of the measurement results becomes more difficult though, as the SP2 bandwidths provided to the AP may be highly asymmetric.

Another special case is that the Speed Box 407 runs on a computer in the Wi-Fi network 406. The advantage of this is that the server from which the Wi-Fi network is run then doubles as a probe for the quality of the Wi-Fi network and further that the terminal 401 does not need to obtain an IP address from the Wi-Fi network 406 before it can measure the quality of the path over that Wi-Fi network. This makes the handover less intrusive.

Typically, once the mobile terminal has performed, or gathered the results of, a speed test over the first network there are several possibilities for the calculation or estimation of the available bandwidth over the second network depending on which element of the network, the terminal, the point of access or the speed box, initiates and performs the test.

In a particularly useful embodiment the point of access in the second network is involved in information gathering and, in a further embodiment, is also involved in decision making. This has the advantage that it allows the mobile terminal to find out about available bandwidth via the second network before it has attached to the second network. In an example in which the second network is a Wi-Fi network, this embodiment allows the mobile terminal to find out available Wi-Fi bandwidth before it has performed a handover and received an IP address from the Wi-Fi Access Point, or AP.

Figure 5:
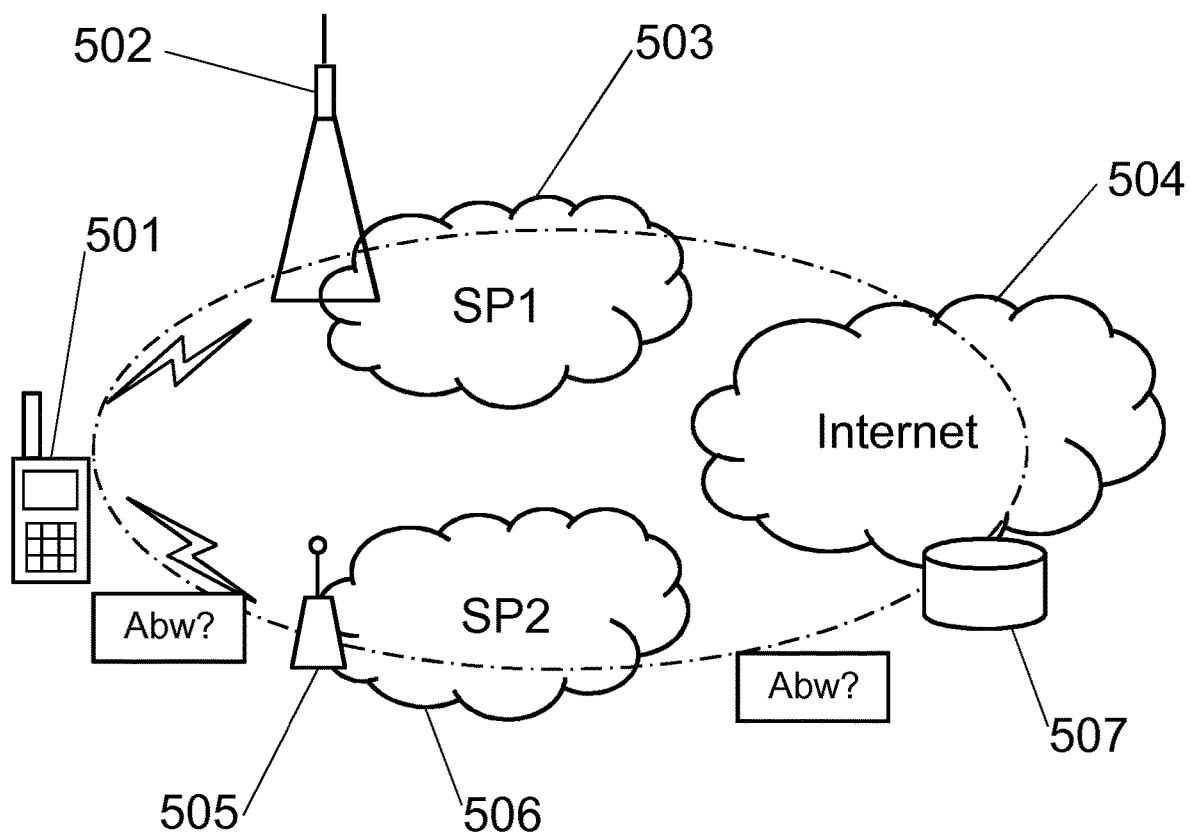
FIG. 5 shows an embodiment of the invention.

This embodiment is show in FIG. 5. Terminal 501 is connected to a base station or eNodeB 502 which is part of the network of service provider SP1 503. Network SP1 503 can be a 3G, 4G or 5G network. Terminal 501 performs or has performed a speed test over SP1 503, through internet 504 to speed box 507. When terminal 501 detects Wi-Fi network SP2 506 through Access Point 505, it needs to obtain two available bandwidth, ABw, values. The first value is the ABw from mobile terminal 501 to AP 505. This value represents the available bandwidth, and therefore quality of service, over the wireless connection itself. The second is the ABw from the AP 505 to the speed box 507. Alternatively available bandwidth values can be measured in the opposite direction, in other words from the speed box 507 to the AP 505 and additionally from the AP 505 to the mobile terminal 501. The former case represents available bandwidth over a path length used for uploading data from the terminal 501 to some server or IP address in the internet 504, the latter represents available bandwidth over a path length used for, conversely, downloading data from the internet 504.

Information about ABw from the AP 505 to the SB 507, or vice versa, can be obtained by the AP 505, or be the speed box 507, or by both, and methods to perform speed tests by either of these devices are known in the art.

As an example, to obtain the available bandwidth between the terminal 501 and AP 505 the terminal can examine the beacon frames received from the AP. From these beacons, terminal 501 is able to calculate the Signal-to-Noise Ratio (SNR) of the radio signals coming from the AP 505 and from that an estimate of the gross maximum available data rate on the Wi-Fi link, in other words the available bandwidth without correction of headers, sync bits, waiting times and bandwidth used by other devices on the same network etc. The gross maximum available data rate will usually be significantly larger than the available bandwidth usable on the application layer. Optionally, after calculating the available bandwidth between itself and AP 505 the mobile terminal 501 can cancel the handover procedure if it finds that the obtained gross maximum available data rate on the Wi-Fi link is lower than the application-layer available bandwidth it has on the 3G/4G link via SP1 503. Examining beacon frames therefore offers terminal 501 a particularly advantageous method of performing a swift and uncomplicated handover decision, in particular in the embodiment in which the speed box is situated in the Access Point itself.

An advantageous way for terminal 501 to obtain the available data rate on the Wi-Fi link is to query AP 505 for this information. Access Point 505 has a better overview of the Wi-Fi network and any associated terminals, including terminal 501, and in particular how much traffic they are generating. Access Point 505 is therefore able to provide the MT with better information regarding available bandwidth on the Wi-Fi network. For instance, the AP 505 may have recently used speed tests to other computer locally on the Wi-Fi network. Also, the AP knows how many other devices are using the Wi-Fi network concurrently and thus have to share the available bandwidth. One way for the terminal 501 to obtain this information is by contacting the AP 505 over the Internet 504. This can be achieved through SP1 503 because the terminal 501 is still connected to the Internet 504 via the 3G/4G network. Therefore AP 505 can be reached via an alternative route. The terminal 501 can request the AP 505 to transmit to it information about the available bandwidth between the AP and the speed box 507. Another way for terminal 501 to obtain information is to have AP 505 periodically, or on demand, upload its information to the speed box 507. The terminal 501 can periodically, or as needed and on demand, collect the uploaded data from speed box 507. After the terminal 501 has collected information on the available bandwidth on the Wi-Fi network as well as the path between AP 505 and speed box 507, it can take the lowest value of the two and compare that value with the result of the measurement over the 3G/4G network. Then it can decide on performing a handover accordingly.

When terminal 501 queries the AP 505 via 3G/4G network SP1 503 and the Internet 504 for information about the Wi-Fi link, the terminal needs to know where, in other words at which IP address, this information can be obtained given the BSSID of the Wi-Fi network it wants to connect to. This requires considerable bookkeeping of BSSIDs with their associated IP addresses.

Figure 6:
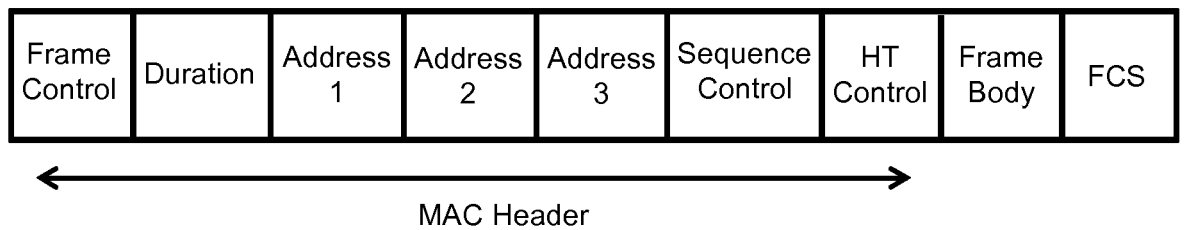
FIG. 6 shows a management frame format that may be used in the invention.

Information about the Wi-Fi link can be obtained via layer 2 of the Wi-Fi network, thus before the terminal has received the IP address from the Wi-Fi AP. In this case, the terminal must announce to the AP its desire of performing a vertical handover. According to the IEEE 802.11 standard governing Wi-Fi this requires that the terminal sends an Association Request message to the AP and that the AP responds with an Association Response message containing an acceptance or rejection of the association request. The Association Request frame may contain so-called 'vendor specific information' in a field within the frame body of the IEEE 802.11 frame, as shown in FIG. 6. Information about the available bandwidth on the 3G/4G path, and which the terminal already knows, can be included by the terminal in the vendor-specific field of the Association Request as transmitted to the AP.

Figure 7:
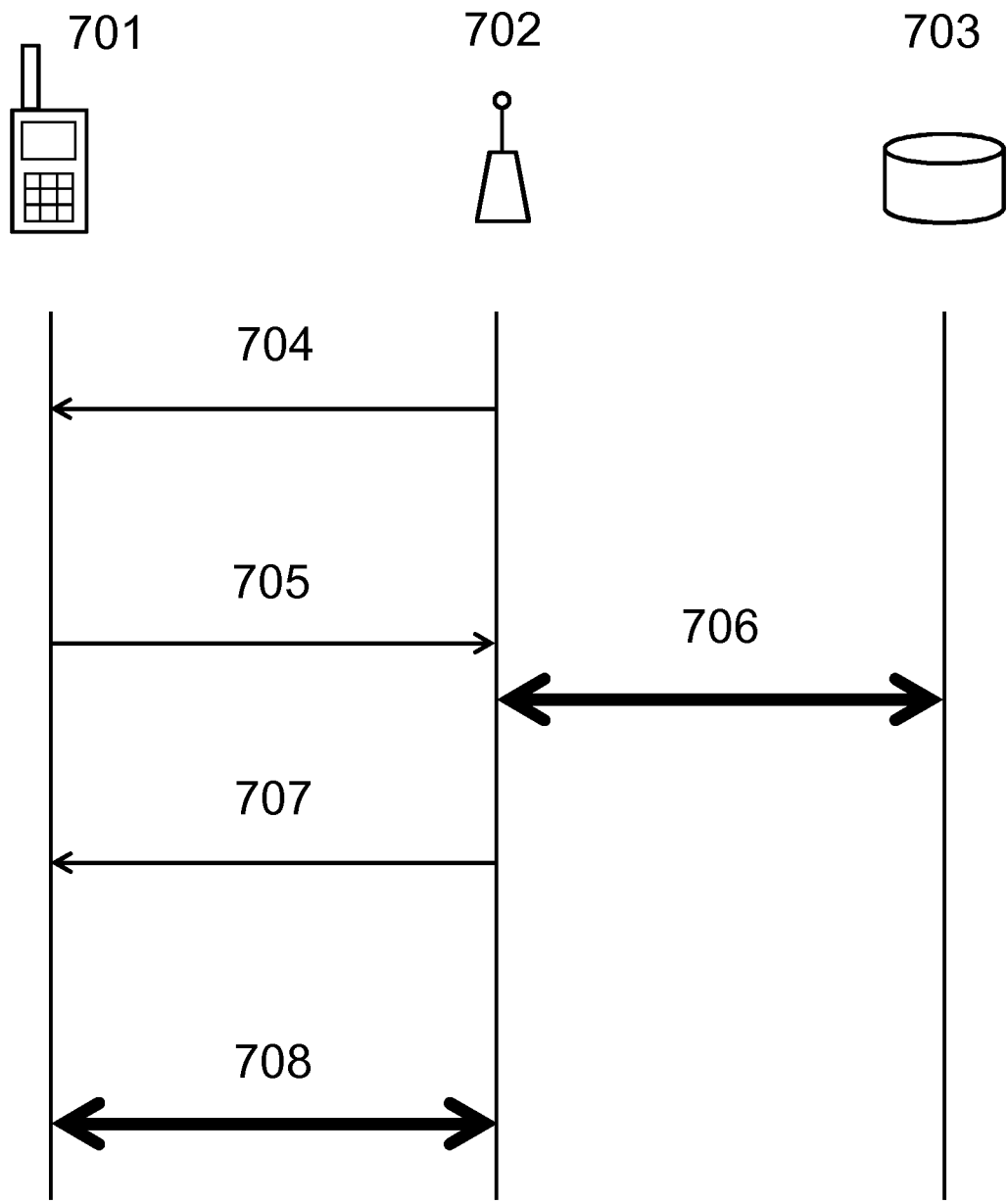
FIG. 7 shows an embodiment of the invention.

This is further shown in FIG. 7. Terminal 701 detects Wi-Fi access point 702 and detects beacon frames 704 from AP 702. Terminal 701 transmits an Association Request 705 to AP 702 in which terminal 701 has included information about the available bandwidth of 3G/4G network to which terminal 701 is already attached. Upon receipt of the Association Request AP 702 performs a speed test 706 between itself and speed box 703. Based on the result of the speed test 706 the AP 702 compares the available bandwidth it can offer terminal 701 with the available bandwidth value transmitted to it in the Association Request and either accepts or rejects 707 the terminal attach request. Typically the AP compares the obtained 3G/4G path available bandwidth with the information it has itself about the Wi-Fi network and the AP-speed box path. If the attach request is accepted terminal 701 proceeds to authentication 708. So in this embodiment instead of the terminal making the association decision, the AP makes the association decision and this is shown in FIG. 8.

Figure 8:
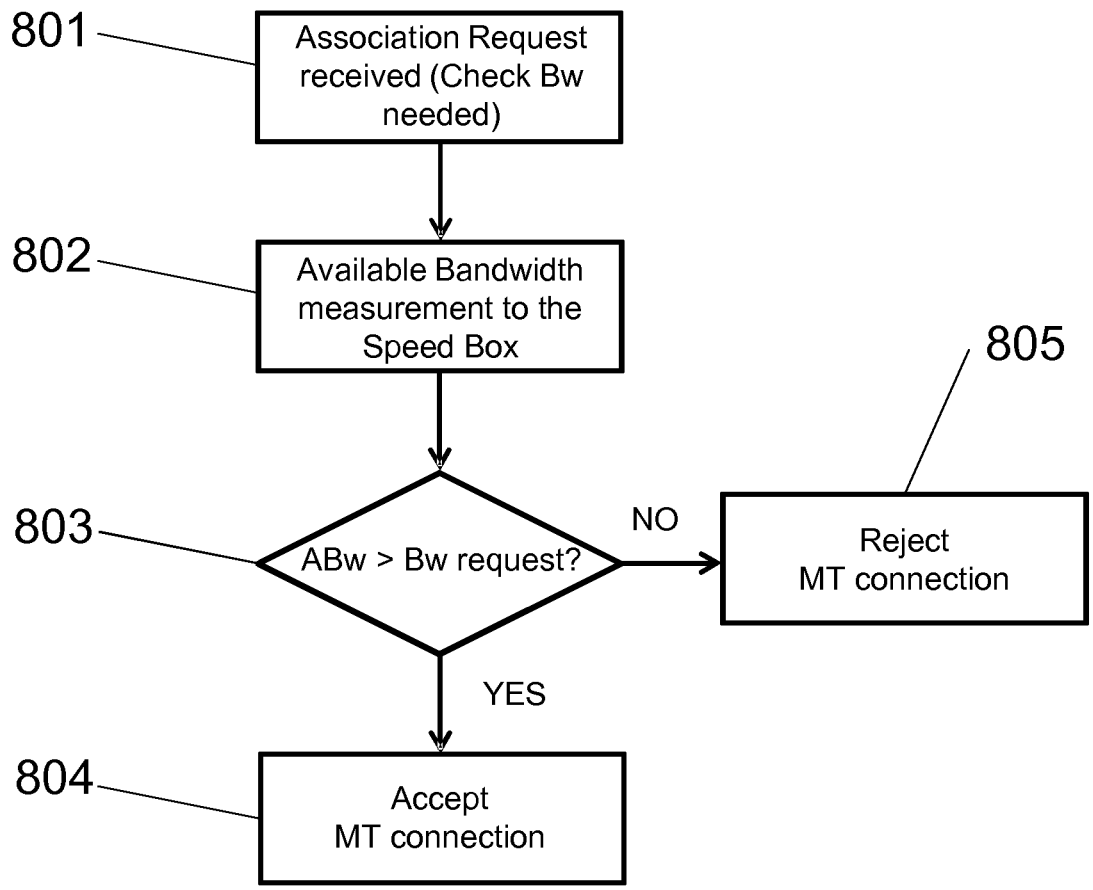
FIG. 8 shows an embodiment of the invention.

FIG. 8 shows a method by which the Access Point can decide whether to allow attach from a terminal. In step 801 an Association Request is received, including information pertaining to the available bandwidth, Bw, already measured across an alternative connection. Next, a speed test is performed between the Access Point and the speed box, 802. From the speed test the AP can calculate how much available bandwidth, ABw, it can offer the terminal in comparison to the bandwidth Bw via the other connection. If ABw is greater than Bw, 803, the terminal attach is accepted 804. If ABw is not greater than Bw, the terminal attach is rejected 805.

An alternative to including information about the available bandwidth on the 3G/4G path in the vendor-specific field of the Association Request as transmitted to the AP is to define a totally new message, or new message exchange, for this information exchange.

An alternative to the Access Point making the decision is that the AP sends its information about the available bandwidth on the Wi-Fi and between itself and the speed box, to the terminal using the vendor specific field in the Association Response message. In this embodiment the terminal then makes the decision.

In the case when the Access Point is involved in information gathering and decision making the Access Point and the speed box perform speed tests between them. There are known techniques for doing this but an important point is how the Access Point knows which speed box to associate with and test, and vice versa. In one embodiment, the terminal has already associated with some speed box before attempting a new vertical handover and the IP address of the speed box is stored already in the terminal and can be transmitted to the Access Point. In one alternative the IP address of the speed box can be hard coded in the terminal, for example in factory settings or upon provisioning of the terminal. Alternatively the terminal can default to the previous speed box that it associated with, in which case the IP address of the speed box needed will be the same as from the last service the terminal used. Alternatively the terminal can receive an IP address from a speed box. In the special case in which the speed box is in fact in the Access Point there will be no need for a specific measurement between the AP and speed box.

Figure 9:
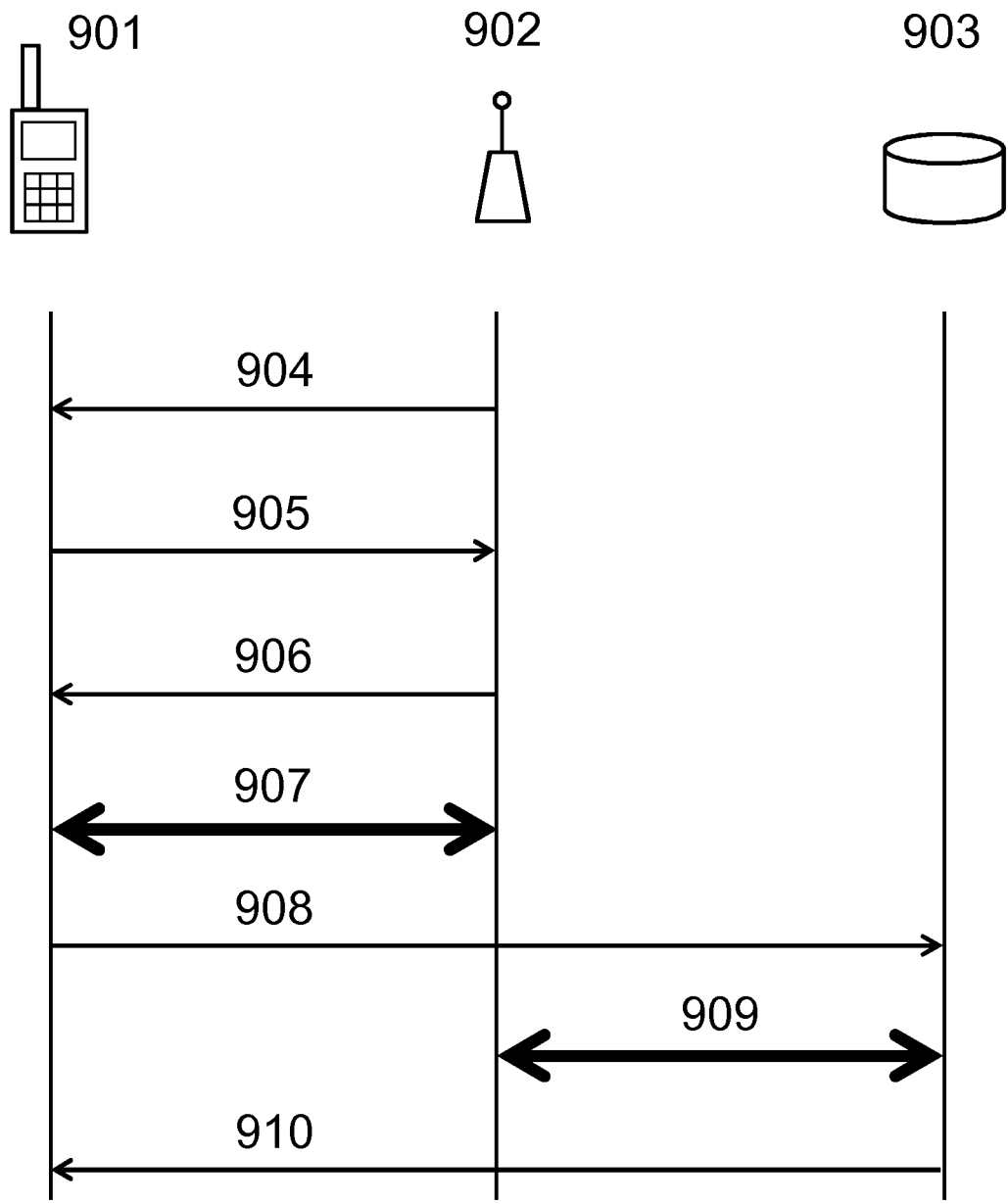
FIG. 9 shows an embodiment of the invention.

The simplest way for speed boxes to keep track of IP addresses of Access Points is that after any handover, the terminal sends an arbitrary message to the speed box via the Wi-Fi network including the BSSID of the Access Point. Then, the speed box knows the IP address of that Access Point and can use it the next time that a terminal wishes to perform a handover to that network. Another way is that Access Points include not only BSSIDs but also their IP addresses in the vendor specific fields of their Beacon messages or Association Response messages, which the terminal then communicates to the speed box. This is shown in FIG. 9.

Terminal 901 detects Wi-Fi access point 902 and detects beacon frames 904 from AP 902. Terminal 901 transmits an Association Request 905 to AP 902 and upon receipt of this the Access Point 902 transmits an Association Accept message 906 to terminal 901. Either the beacon frames or the Association Accept message includes information regarding the IP address of AP 902. Once in receipt of the Association Accept the terminal 901 performs authentication 907 with AP 902. After authentication the terminal 901 transmits the AP IP address 908 to speed box 903. Upon receipt of the AP IP address the speed box 903 performs a speed test 909 to that IP address and informs the terminal of the result 910.

If no association at all can be made between the Access Point and the speed box, the Access Point can estimate its available bandwidth to the Internet by choosing some default speed box in the Internet instead of the terminal's own preferred speed box.

After association between Access Point and speed box, speed tests between the two can be performed either periodically or on demand.

Figure 10:
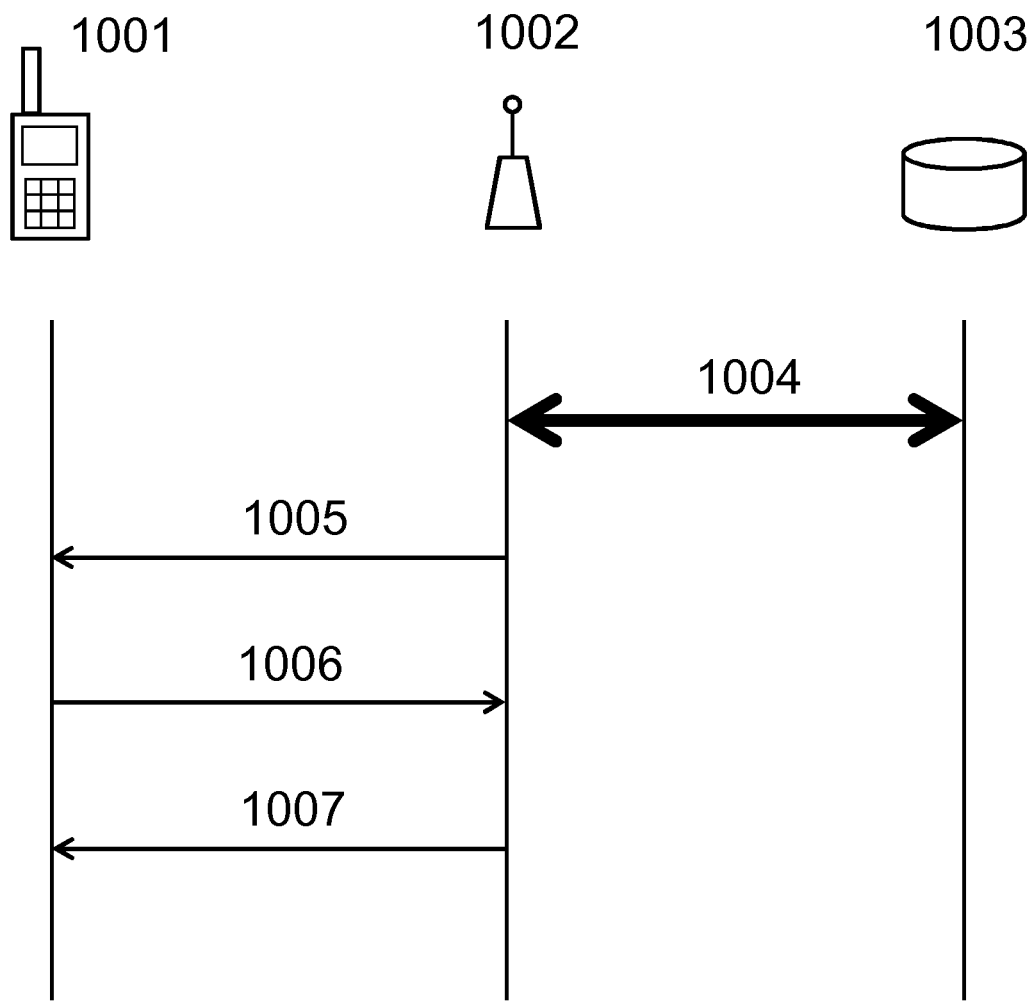
FIG. 10 shows an embodiment of the invention.

If speed tests are performed periodically then preferably the result of the latest speed test is maintained in the Access Point or speed box, depending on which of the two is receiving the request from the terminal, and used for decision making after the next request from the terminal. The terminal can be informed via the vendor specific field of the Beacon or by a separate inform message after association. This embodiment is shown in FIG. 10 in which terminal 1001 detects Wi-Fi access point 1002 which performs a speed test 1004 to speed box 1003. Access Point 1002 includes the result in beacon frames broadcast 1005 which is detected by terminal 1001. Terminal 1001 can then decide to perform a handover. If so, it will transmit an Association Request 1006 which is accepted 1007 by the Access Point.

If speed tests are performed on demand then typically the Access Point performs a speed test to the speed box, or vice versa, after the Access Point receives the Association Request from the terminal or after the speed box receives a request for information from the terminal. If the available bandwidth obtained from this test is larger than the value obtained by the terminal via the 3G/4G network, then an association request is accepted and a handover is performed. Or in the case when the Access Point cannot use the vendor specific field the terminal can be informed by a separate inform message after association.

Figure 11:
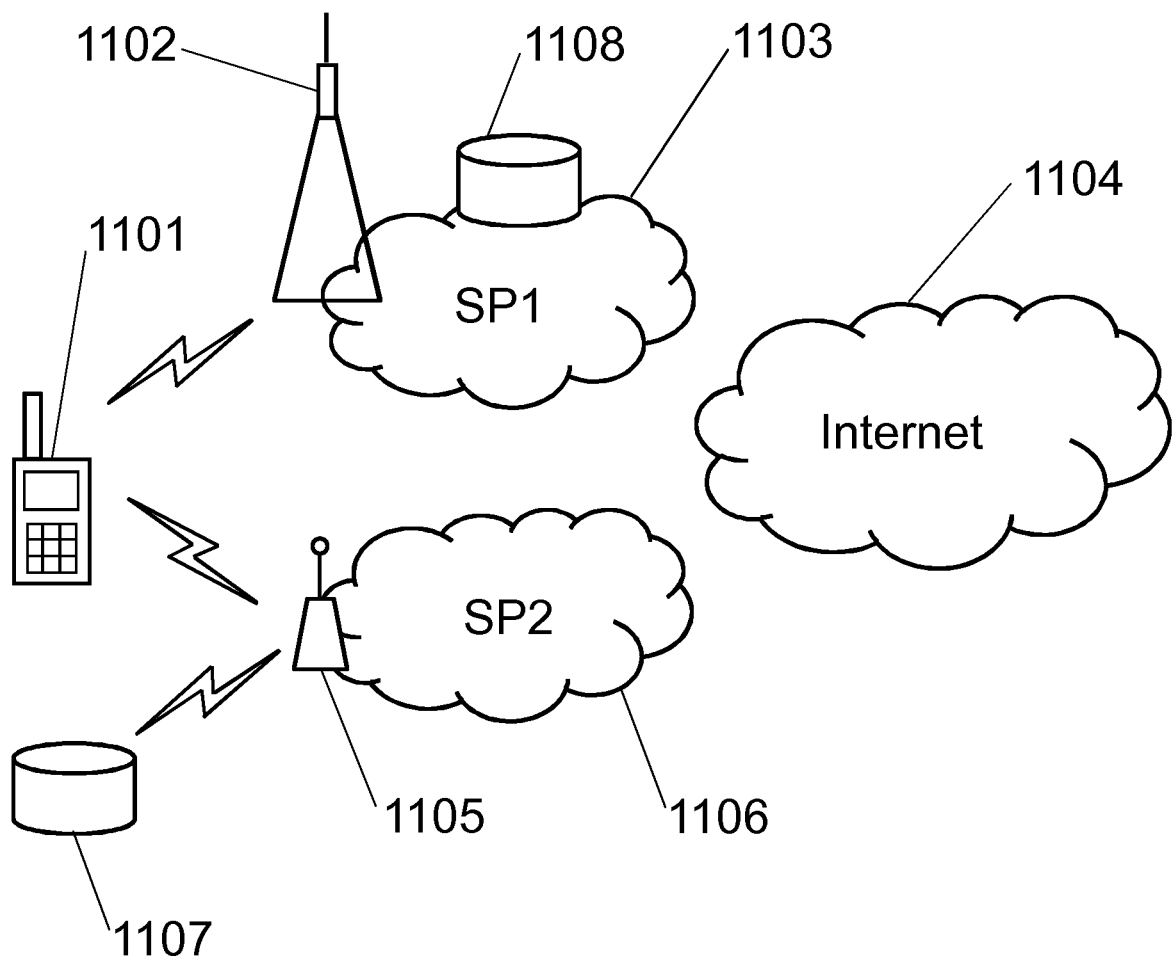
FIG. 11 shows an embodiment of the invention.

In a particularly advantageous embodiment the speed box runs on a computer in the Wi-Fi network. Probing the network path quality between terminal and speed box then includes the first network, typically a 3G/4G/5G network as well as the Wi-Fi, second network part. The speed box thus doubles as a probe for the quality of the Internet end-to-end path as well as the quality of the Wi-Fi network. This means that the terminal does not need to obtain an IP address from the Wi-Fi network before it can measure the quality of the path over the Wi-Fi network. This makes the handover less intrusive. A further advantage is that since the fixed point is in the Wi-Fi network no additional server need be set up further back in the internet, for example. A further advantage is that since the fixed point is on a computer in the Wi-Fi network the functionality of the invention as operated from the fixed point can be provided in software, separately, to be run on the computer located in the Wi-Fi network. This is shown in FIG. 11 in which terminal 1101 is connected to a base station or eNodeB 1102 which is part of the network of service provider SP1 1103. Network SP1 1103 can be a 3G, 4G or 5G network. Terminal 1101 detects Wi-Fi network SP2 1106 through Access Point 1105. Speed box 1107 is located in the Wi-Fi network.

However in this particular embodiment, when performing vertical handover the other way round, from the Wi-Fi network 1106 to the 3G/4G network 1103, the terminal first performs handover, including change of IP address, before the network quality of the second network, the 3G/4G network, can be measured. The reason is that if the fixed point, or speed box, is in the Wi-Fi network it cannot also be in the 3G/4G radio network of interest and therefore does not have access to 3G/4G infrastructure. Typically, in any event, 3G/4G infrastructure is the domain of a mobile network operator. One solution to this is would be for the 3G/4G network operator SP1 1103 to deploy a further speed box 1108 either in the 3G/4G radio network or somewhere in the SP1 cloud and this leads to a further embodiment of the invention. This further speed box can be used for speed tests when a terminal wishes to consider handover back to the 3G/4G network from a Wi-Fi network.

With the terminal in the 3G/4G network wishing to perform a handover to the Wi-Fi network, probing the network path quality between the terminal and a speed box in the Wi-Fi network includes the 3G/4G part of the network as well as the Wi-Fi part. The result thus contains contribution from both networks, which need to be disentangled to make an informed decision on either staying on the 3G/4G network or performing a handover. This is easily done when there is a second speed box 1108 in the SP1 network, for example in the cloud. The terminal then performs measurements to both speed boxes 1107 and 1108 and compares the results. The difference in results is caused by the Wi-Fi network. If there is no speed box in the SP1 network, and only a speed box in the Wi-Fi network, then available bandwidth measurement methods need to be used that give information about the individual layer-2 links in the network path.

In an alternative embodiment it is possible to perform the vertical handover without the need of a speed box. Both networks SP1 and SP2 have procedures by which they can know the available bandwidth in the core network. In this case the core of the network acts as the fixed point and when available bandwidth can be calculated, or estimated, or measured, from the terminal to the core network then there is enough information to decide whether to perform a vertical handover or not.

In yet a further, and particularly simple, embodiment in which the terminal gathers all information and makes the decision, the terminal first performs a handover regardless of the available bandwidth and once it is attached to the Wi-Fi, in other words connected, authenticated and with a new IP address, it can perform a speed test against the speed box and calculate the available bandwidth (ABw) it can get. The MT now compares this result with the available bandwidth through the first network and based on the results possibly switches back to the 3G/4G network.

The invention as described is also applicable to handovers to other networks and between other networks, for instance from Wi-Fi to 3G/4G/5G or from fixed access (DSL, fiber, . . . ) to 3G/4G/5G etc. Also 3G/4G networks themselves contain APs (which have Access Point Names, or APNs), but these are generally not located at or near a base station, but further in the operator or service provider network. In this arrangement so-called PDP contexts are activated instead of exchanges of Association Request and Response messages and therefore information about bandwidth according to the previously described embodiments would be included in PDP messages between terminals and APNs. In general, all references to 3G/4G networks apply also to 5G networks and references to specific messaging systems and protocols apply equally to other, equivalent, messaging systems which provide the same, or equivalent, functionality. Generally, references to 'terminal' includes mobile terminal, mobile phone, tablet, laptop, computer plus other hand held devices capable of connecting to more than one type of network.

Similarly, network path performance measurements do not only refer to available bandwidth measurements, but may also refer to measurements of delay, jitter, packet loss, bit error rate, etc., and any combinations of those, or to predictions of available bandwidths, delays, etc. So for example, instead of bandwidth a terminal may acquire and compare measurements of packet loss for two networks if this measure is more appropriate.

While performing vertical handover using the system or method of the invention would normally mean handing over all services from the first network to the second it does not always necessitate this. It is possible that handover of only certain data, or certain applications, may be performed instead of all data. The terminal can decide to keep some applications (for example Skype) still working over the 3G/4G network while moving the data of the other applications to the Wi-Fi network. This means that the MT would remain connected to both networks at the same time. This will use more resources but may be temporarily applicable, for example if the user is performing a voice call over a first network while simultaneously downloading data which may need access to a network offering greater bandwidth. The MT should also be able to match the bandwidth needs of individual applications to the total available bandwidth.

The invention provides an advantageous system and method of managing terminal attachment to first and second networks.

The invention claimed is:

1. A system for making a vertical handover decision between a first network and a second network, comprising:
   a first network,
   a second network being a Wi-Fi network to which a terminal can attach through an Access Point,
   a terminal configured to attach to both the first and second networks,
   a fixed point in either the first or second network or in the Internet; and
   wherein both the first and second networks allow information flow between the terminal and the fixed point, and wherein the terminal is configured to, when attached to the first network:
      detect the second network;
      perform a first bandwidth measurement representing available bandwidth along a first path length between the terminal and the fixed point, which first path length includes access to the fixed point through the first network;
      obtain, while not being attached to the second network, a second bandwidth measurement representing available bandwidth along a second path length between the terminal and the fixed point, which second path length includes access to the fixed point through the second network, by requesting data for the second bandwidth measurement from the Access Point of the second network or from the fixed point through the first network;
      compare the first bandwidth measurement to the second bandwidth measurement;
      maintain attachment to the first network if the first bandwidth measurement is higher than the second bandwidth measurement;
      make a decision to handover to the second network if the second bandwidth measurement is higher than the first bandwidth measurement.

2. The system according to claim 1 wherein the fixed point is a server or a dedicated computer.

3. The system according to claim 1 wherein either the first or second network is a 3G or 4G or 5G telecommunications network.

4. The system according to claim 1 wherein the fixed point is in the Access Point.

5. The system according to claim 1 wherein the Wi-Fi network is a domestic Wi-Fi network and the fixed point is on a home gateway in the domestic Wi-Fi network configured to connect the domestic Wi-Fi network to a wider network.

6. The system according to claim 1 wherein the second bandwidth measurement received from the Access Point is derived from a beacon frame.

7. The system according to claim 1 wherein the second bandwidth measurement received from the Access Point is comprised in a beacon frame, Association Accept message or Association Reject message.

8. The system according to claim 7 wherein the second bandwidth measurement received in either the beacon frame, Association Accept message or Association Reject message is comprised in a vendor specific field in the respective message.

9. The system according to claim 1 wherein the terminal is configured to store the first or second bandwidth measurement before comparison.

10. The system according to claim 2 wherein the terminal is further configured to request data for the second bandwidth measurement from the server or dedicated computer.

11. A method of making a vertical handover decision between a first network and a second network being a Wi-Fi network to which a terminal can attach through an Access Point, wherein both the first and second networks allow information flow between a terminal and a fixed point, the method performed in the terminal attached to the first network, and in which the terminal:
   detects the second network;
   performs a first bandwidth measurement representing available bandwidth along a first path length between the terminal and the fixed point, which first path length includes access to the fixed point through the first network;
   obtains, while not being attached to the second network, a second bandwidth measurement representing available bandwidth along a second path length between the terminal and the fixed point, which second path length includes access to the fixed point through the second network, by requesting data for the second bandwidth measurement from the Access Point of the second network or from the fixed point through the first network;
   compares a first bandwidth measurement with a second bandwidth measurement and:
      if the first bandwidth measurement is higher than the second bandwidth measurement the terminal maintains attachment to the first network;
      if the second bandwidth measurement is higher than the first bandwidth measurement the terminal makes a decision to perform a vertical handover to the second network.

12. The method according to claim 11 wherein the comparison between the first bandwidth measurement and the second bandwidth measurement occurs before the terminal is authenticated in the second network.

13. The method according to claim 11 wherein if the second bandwidth measurement is higher than the first bandwidth measurement and the terminal detects that an active session is underway through the first network, the terminal further defers the vertical handover until after the active session has ended.

14. The method according to claim 11 wherein if the first bandwidth measurement is higher than the second bandwidth measurement the terminal acquires a new second bandwidth measurement and re-performs comparison.

15. A terminal for making a vertical handover decision between a first network and a second network being a Wi-Fi network to which the terminal can attach through an Access Point, the terminal configured to attach to both the first and second networks, wherein both the first and second networks allow information flow between the terminal and a fixed point, and wherein the terminal is configured to, when attached to the first network:

detect the second network;

perform a first bandwidth measurement representing available bandwidth along a first path length between the terminal and the fixed point, which first path length includes access to the fixed point through the first network;

obtain, while not being attached to the second network, a second bandwidth measurement representing available bandwidth along a second path length between the terminal and the fixed point, which second path length includes access to the fixed point through the second network, by requesting data for the second bandwidth measurement from the Access Point of the second network or from the fixed point through the first network;

compare the first bandwidth measurement to the second bandwidth measurement;

maintain attachment to the first network if the first bandwidth measurement is higher than the second bandwidth measurement;

make a decision to handover to the second network if the second bandwidth measurement is higher than the first bandwidth measurement.

* * * * *